(12) United States Patent
Tada et al.

(10) Patent No.: US 7,804,393 B2
(45) Date of Patent: Sep. 28, 2010

(54) TAPE CARTRIDGE MANAGEMENT SYSTEM AND TAPE CARTRIDGE

(75) Inventors: Nobuyuki Tada, Kanagawa (JP); Nobuaki Higashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 964 days.

(21) Appl. No.: 11/476,613

(22) Filed: Jun. 29, 2006

(65) Prior Publication Data
US 2007/0008641 A1 Jan. 11, 2007

(30) Foreign Application Priority Data
Jul. 7, 2005 (JP) .............................. 2005-198350

(51) Int. Cl.
*H04Q 5/22* (2006.01)
(52) U.S. Cl. ..................... 340/10.1; 235/375; 360/69
(58) Field of Classification Search ................ 340/10.1; 235/375; 360/69
See application file for complete search history.

(56) References Cited

U.S. PATENT DOCUMENTS

| | | | | |
|---|---|---|---|---|
| 6,466,990 | B2 * | 10/2002 | Frary | 719/310 |
| 6,614,750 | B2 * | 9/2003 | Weber et al. | 720/718 |
| 6,675,063 | B2 * | 1/2004 | Bosley et al. | 700/218 |
| 7,145,460 | B1 * | 12/2006 | Wojciechowski et al. | 340/572.8 |
| 7,227,721 | B1 * | 6/2007 | Kientz et al. | 360/132 |
| 7,240,825 | B2 * | 7/2007 | Tada | 235/375 |
| 2005/0133583 | A1 * | 6/2005 | Tada | 235/375 |
| 2005/0213440 | A1 * | 9/2005 | Goodman et al. | 369/30.27 |
| 2006/0180694 | A1 * | 8/2006 | Battles et al. | 242/348 |
| 2007/0008641 | A1 * | 1/2007 | Tada et al. | 360/69 |
| 2007/0051803 | A1 * | 3/2007 | Tada et al. | 235/384 |
| 2007/0133116 | A1 * | 6/2007 | Goodman et al. | 360/69 |
| 2007/0140525 | A1 * | 6/2007 | Kottomtharayil | 382/103 |
| 2007/0235516 | A1 * | 10/2007 | Georgis et al. | 235/375 |
| 2008/0218901 | A1 * | 9/2008 | Haustein et al. | 360/90 |

FOREIGN PATENT DOCUMENTS

JP 6-267183 A 9/1994

(Continued)

OTHER PUBLICATIONS

Japanese Office Action dated Nov. 5, 2009 in corresponding Japanese Patent Application No. 2005-198350.

*Primary Examiner*—Daniel Wu
*Assistant Examiner*—Bradley E Thompson
(74) *Attorney, Agent, or Firm*—Sughrue Mion, PLLC

(57) ABSTRACT

A tape cartridge management system which includes a plurality of tape cartridges, an RFID tag for storing management information being arranged at outside or inside of a case of the tape cartridges, and a reader-writer for reading and writing the management information stored in the RFID tag, the reader-writer being configured to be capable of reading and writing the management information with an identical positional relation against the plurality of the tape cartridges, wherein the tape cartridges for arranging the RFID tag at the outside of the case is provided with the RFID tag on an external surface of a side wall on which a label pasting member of the case is disposed, and wherein the tape cartridges for arranging the RFID tag at the inside of the case is provided with the RFID tag on an internal surface of the side wall on which the label pasting member of the case is disposed.

14 Claims, 4 Drawing Sheets

FOREIGN PATENT DOCUMENTS

| | | |
|---|---|---|
| JP | 2001-167240 A | 6/2001 |
| JP | 2001-216756 A | 8/2001 |
| JP | 2001-256455 A | 9/2001 |
| JP | 2001-291355 A | 10/2001 |
| JP | 2001291355 A * | 10/2001 |
| JP | 2005-78715 A | 3/2005 |
| JP | 2005-108271 A | 4/2005 |

* cited by examiner

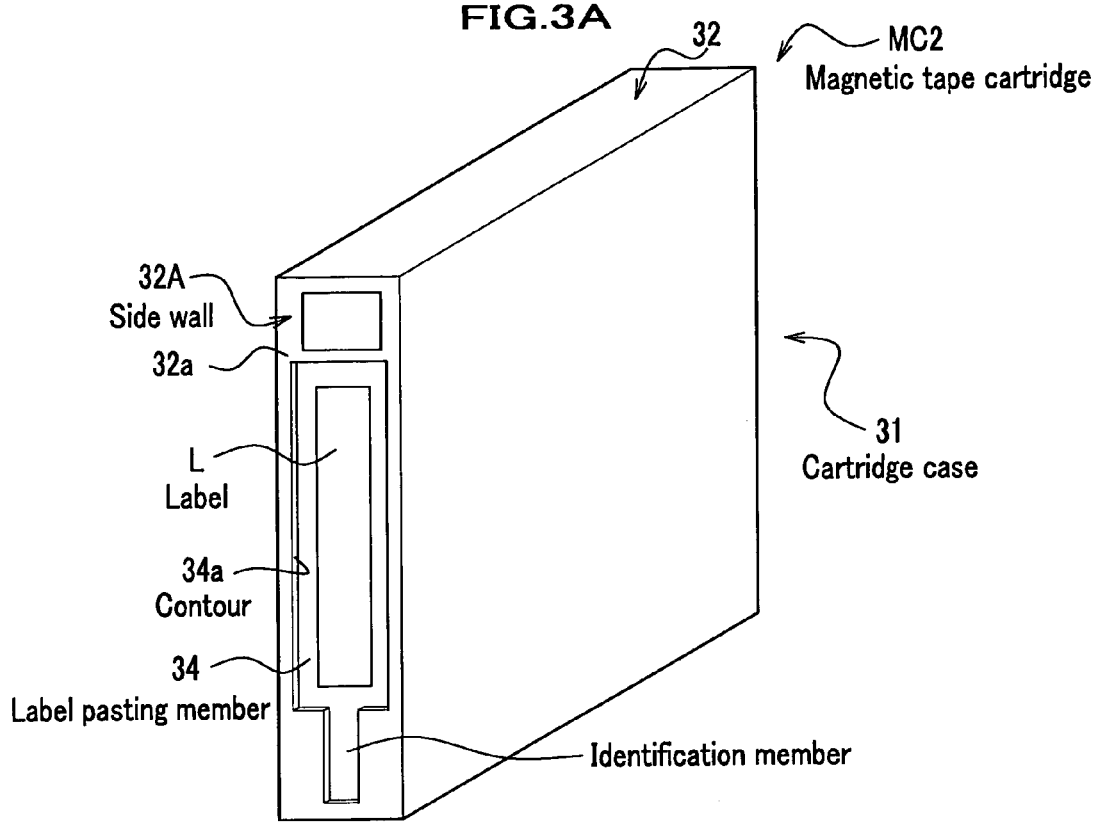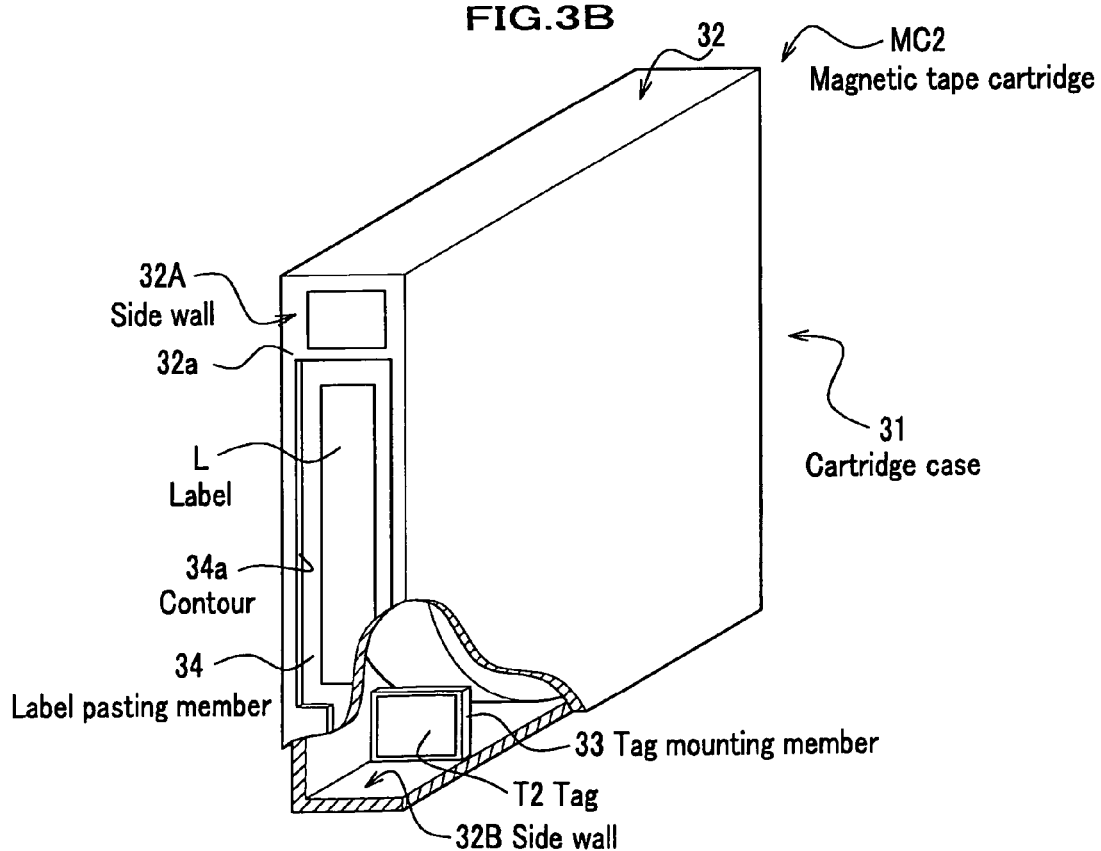

US 7,804,393 B2

TAPE CARTRIDGE MANAGEMENT SYSTEM AND TAPE CARTRIDGE

CROSS REFERENCE TO RELATED APPLICATIONS

This application claims the foreign priority benefit under Title 35, United States Code, §119(a)-(d) of Japanese Patent Applications No. 2005-198350, filed on Jul. 7, 2005, the contents of which are hereby incorporated by reference.

BACKGROUND OF THE INVENTION

1. Field of the Invention

The present invention relates to a tape cartridge management system and a tape cartridge, and more particularly, relates to a tape cartridge management system and a tape cartridge which use an RFID (Radio Frequency Identification) tag storing management information.

2. Description of Relevant Art

In recent years, a system for conducting an inventory management and location management of a single tape cartridge by mounting an RFID tag (hereinafter, referred to as tag) on the tape cartridge has been developed. The system has been designed by considering existing products, that is, an external type of tag (hereinafter, referred to as external tag) mounted on an outside of the tape cartridge has been mainly used by considering workability at a user side.

Regarding the external tag, there is a chance that the tag which was once peeled off from a product is pasted on another product by accident since the tag is easily peeled off. For preventing the tag from such an improper using, an external tag having a structure to be broken when the tag is peeled off has been proposed in the past. Such a tag described in the above is disclosed, for example, in a paragraph [0012] of Japanese Laid-Open Patent Publication No. 2001-167240 and in paragraphs [0006], [0007] of Japanese Laid-Open Patent Publication No. 2001-256455.

In contrast with the above, for preventing the tag from being improperly used and for improving security, an internal type of tag (hereinafter, referred to as internal tag) mounted on an inside of a tape cartridge may be conceivable so that the tag can not be peeled off from outside.

However, if the external tag for existing products is entirely replaced with the internal tag, a cost for replacing the external tag becomes expensive and substantially large. Therefore, a procedure to replace the external tag with the internal tag, while using the conventional external tag, may be thought. During transition of the tag, since two types of tags exist, the management system is required to be configured so that the two types of the tag can be easily managed with a single management system.

On the other hand, if both of the internal and external tags are mounted on a single tape cartridge, the two tags simultaneously response, thereby resulting in confusion which information of the tags should be made effective.

It is, therefore, an object of the present invention to provide a tape cartridge management system and a tape cartridge which can manage the tape cartridge with an external tag and the tape cartridge with an internal tag by a single tape cartridge management system, while the tape cartridge management system and tape cartridge eliminate the aforementioned issues.

SUMMARY OF THE INVENTION

According to a first aspect of the present invention, there is provided a tape cartridge management system, comprising: a plurality of tape cartridges, wherein an RFID tag for storing management information being arranged outside or inside of each case of the tape cartridges; and a reader-writer for reading and writing the management information stored in the RFID tag, wherein the reader-writer being configured to be able to read and write the management information with an identical positional relation with respect to the plurality of the tape cartridges, wherein the tape cartridges arranging the RFID tag at an outside of the case are provided with the RFID tag on an external surface of a side wall on which a label pasting member of the case is disposed, and wherein the tape cartridges arranging the RFID tag at an inside of the case are provided with the RFID tag on an internal surface of the side wall on which the label pasting member of the case is disposed.

According to the above invention, there are two types of tape cartridges. One is an external type where the RFID tag is arranged on the external surface of the side wall on which the label pasting member is disposed. The other is an internal type where the RFID tag is arranged at an inside of the side wall on which the label pasting member is disposed. In the present system, a position for arranging the RFID tag is fixed at outside or inside of the side wall on which the label pasting member is disposed. Therefore, the reader-writer can read or write the management information with the identical positional relation with respect to each tape cartridge. Accordingly, the present system can manage the tape cartridge with a single system regardless of the type of tape cartridges, that is, the external type or internal type.

According to a second aspect of the present invention, there is provided a tape cartridge comprising a case where a label pasting member is disposed on an external surface of a side wall of the case and an RFID tag arranged inside of the side wall, wherein an identification member for preventing the RFID tag from being externally mis-mounted is disposed on the external surface of the side wall.

According to the above invention, the RFID tag is arranged inside the side wall. In addition, the identification member for preventing the RFID tag from being externally mis-mounted is disposed on the external surface of the side wall. Therefore, the internal type of tape cartridge is prevented from a double-mounting of the RFID tag by the external mis-mounting of the RFID tag. Accordingly, troubles caused by the double-mounting of the RFID tag can be prevented. Meanwhile, the second aspect of the present invention is a tape cartridge which is usable in the tape cartridge management system described in the first aspect of the present invention.

According to a third aspect of the present invention, there is provided a tape cartridge, wherein the identification member is formed with a different shape of contour of the label pasting member from a shape of contour of the label pasting member of the tape cartridge where the RFID tag is not arranged inside the tape cartridge.

According to the above invention, since the contour of the label pasting member is formed with a different shape from a shape of contour of the label pasting member of the tape cartridge where the RFID tag is not arranged inside the tape cartridge, attention is reminded, thereby resulting in prevention of the external mis-mounting of the RFID tag.

According to a fourth aspect of the present invention, there is provided a tape cartridge, wherein the identification member is formed with a different shape of external surface of the side wall from a shape of external surface of the side wall of the tape cartridge where the RFID tag is not arranged inside the tape cartridge.

According to the above invention, since the shape of external surface of the side wall is formed to be different from the shape of external surface of the side wall of the tape cartridge where the RFID tag is not arranged inside the tape cartridge, attention is reminded, thereby resulting in prevention of the external mis-mounting of the RFID tag.

According to a fifth aspect of the present invention, there is provided a tape cartridge, wherein the identification member is provided with a notice on the external surface of the side wall for reminding attention.

According to the above invention, since the notice for reminding attention is provided on the external surface of the side wall, attention is reminded, thereby resulting in prevention of the external mis-mounting of the RFID tag.

Meanwhile, the notice of the identification member may be directly notified on the side wall of the case, or may be notified on the label pasted on the label pasting member.

According to the tape cartridge management system of the present invention, the system can manage the tape cartridge with a single system regardless of the type of tape cartridges, that is, the external type and internal type.

In addition, according to the tape cartridge of the present invention, the tape cartridge can be prevented from the double-mounting of the RFID tag by the external mis-mounting of the RFID tag, and can be used for the tape cartridge management system of the present invention.

BRIEF DESCRIPTION OF THE DRAWINGS

FIG. 3A is a perspective view of a magnetic tape cartridge with an internal tag;

FIG. 3B is a partial cross sectional perspective view of the magnetic tape cartridge shown in FIG. 3A;

DETAILED DESCRIPTION OF THE PREFERRED EMBODIMENT

Embodiment

Figure 1:
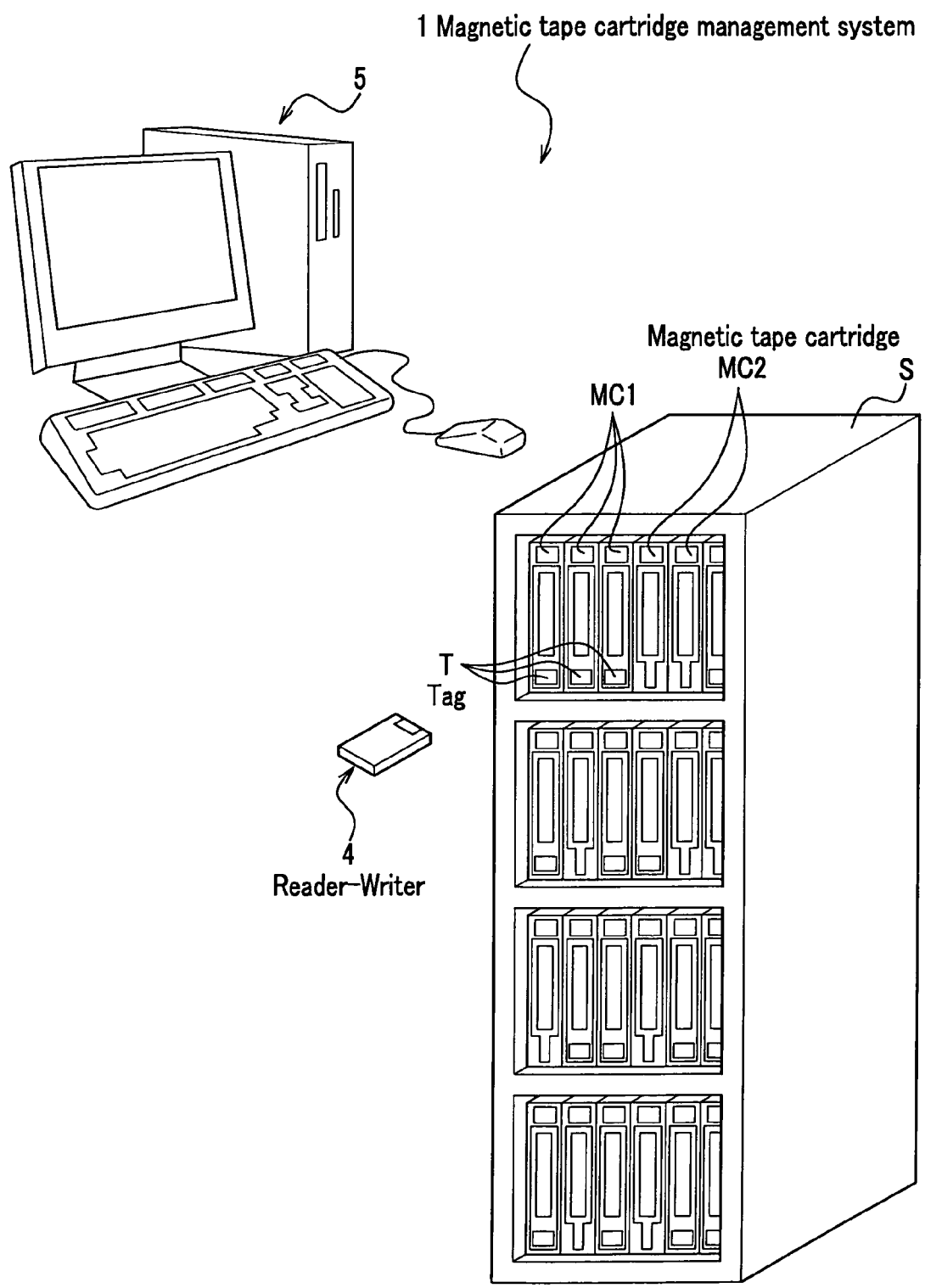
FIG. 1 is an illustration showing a configuration of a tape cartridge management system according to an embodiment of the present invention.

Next, an embodiment of the present invention will be explained in detail by referring to figures, as needed. FIG. 1 is an illustration showing a configuration of a tape cartridge management system according to the embodiment of the present invention.

As shown in FIG. 1, a magnetic tape cartridge management system 1 according to the embodiment is a system for managing each magnetic tape cartridge by using a tag T of an RFID tag, and includes a plurality of magnetic tape cartridges MC (MC1, MC2) which are arranged in a rack S, a reader-writer 4, and a computer 5.

The tag T includes an IC chip which stores various kinds of management information and an antenna, which is connected to the IC chip, for transmitting and receiving information to and from the reader-writer 4. The tag T is a label tag in which the IC chip and the antenna are arranged in a unified manner on a substrate. The management information stored in the tag T can be wirelessly read and written by the reader-writer 4. Here, the management information stored in the IC chip is, for example, ID and location information specific to the magnetic tape cartridge. Hereinafter, a tag mounted on a magnetic tape cartridge MC1 is called tag T1, and that of a magnetic tape cartridge MC2 is called tag T2.

The plurality of magnetic tape cartridges MC contained in the rack S are, for example, ones in conformity with LTO (Linear Tape-Open) regulations, and divided into two types of magnetic tape cartridges MC1, MC2 according to a position where the tag T (T1, T2: RFID tag) is mounted.

Figure 2:
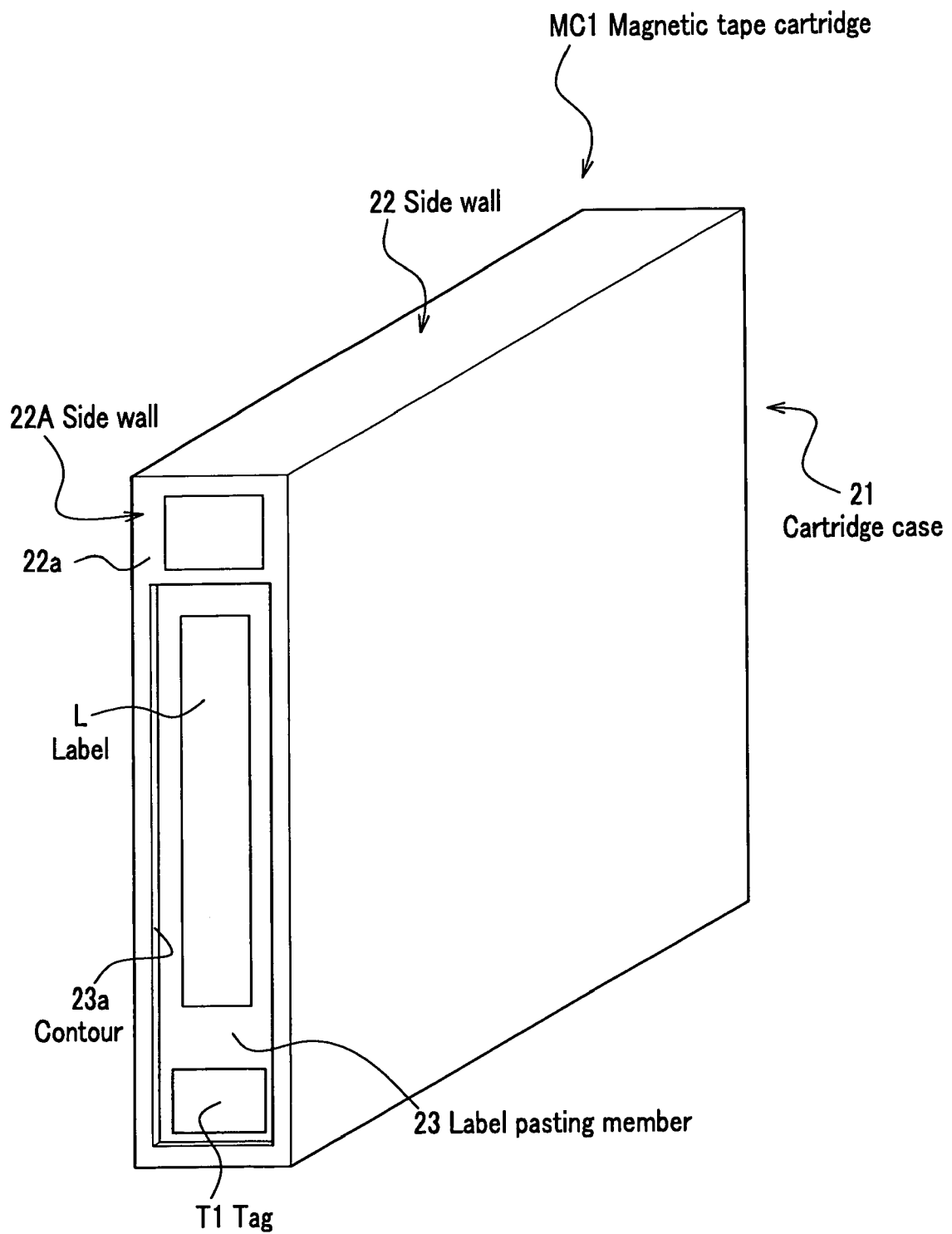
FIG. 2 is a perspective view of a magnetic tape cartridge with an external tag.

FIG. 2 is a perspective view showing a magnetic tape cartridge with an external tag. In addition, FIG. 3A is a perspective view showing a magnetic tape cartridge with an internal tag, and FIG. 3B is a partial cross sectional perspective view of the tape cartridge shown in FIG. 3A. Meanwhile, the tape cartridges shown in FIG. 2, FIG. 3A, and FIG. 3B show postures of the tape cartridges to be arranged in the rack S (refer to FIG. 1). Hereinafter, the following explanation will be made by fixing a top and bottom of the tape cartridges on the basis of the above postures.

First, the magnetic tape cartridge MC1 with the external tag T1 will be explained. As shown in FIG. 2, the magnetic tape cartridge MC1 is provided with a cartridge case 21 (case) containing a reel on which a magnetic tape (not shown) is reeled, and the tag T1 is mounted on an outside of the cartridge case 21.

The cartridge case 21 is a box formed in nearly cuboid, and a label pasting member 23 is disposed on a side wall 22A, which is one of four side walls 22, facing to a recording surface of the magnetic tape (not shown).

The label pasting member 23 is a portion for pasting a label L which indicates, for example, a management number for identification, a content of stored data, and a time and date of data backup. The label pasting member 23 is surrounded with a contour 23a which has a rectangular shape and covers almost whole external surface 22a of the side wall 22A on which a safety lug is arranged, and configured to be a little concave from an outside surface area of the contour 23a.

The tag T1 is pasted on a lower part of the label pasting member 23 of the side wall 22A with a bond applied on a backside of the substrate of the tag. Through the above, the tag T1 is arranged so that the antenna, which is formed along a surface of the tag and has a coiled shape, is oriented to an external direction.

Next, the magnetic tape cartridge MC2 with the internal tag T2 will be explained. As shown in FIG. 3A, similar to the aforementioned magnetic tape cartridge MC1 (refer to FIG. 2), the magnetic tape cartridge MC2 is provided with a cartridge case 31 (case) containing a reel on which a magnetic tape (not shown) is reeled, and the tag T2 is mounted on an inside of the cartridge case 31.

The cartridge case 31 is a box formed in nearly cuboid, and a label pasting member 34 is disposed on a side wall 32A, which is one of four side walls 32, facing to a recording surface of the magnetic tape (not shown). In addition, as shown in FIG. 3B, a tag mounting member 33 is disposed upright on an internal surface of a side wall 32B, which is perpendicular to the side wall 32A, so that the tag mounting member 33 faces to an internal surface of lower part of the side wall 32A.

As shown in FIG. 3A, the label pasting member 34 is a portion for pasting a label L which indicates, for example, a management number for identification, a content of stored data, and a time and date of data backup. The label pasting member 34 is surrounded with a contour 34a on the external surface 32a of the side wall 32A on which a safety lug is arranged, and configured to be a little concave from an outside surface area of the contour 34a. The contour 34a is configured with an upper rectangular contour and a lower rectangular contour which is narrower than that of the upper contour. Both of the contours form a continuous and unified contour. Since the contour 34a of the label pasting member 34 is formed to be different from the contour 23a of the label pasting member 23 of the magnetic tape cartridge MC1, it can be checked with eyes that the contour 34a is not for the external tag. In addition, attention for mis-pasting of the external tag is reminded. The lower contour of the contour 34a is preferable to be formed narrower than the external tag T1 (refer to FIG. 2). By forming the lower contour like the above, if the external tag is pasted on the lower part of the label pasting member 34 with a similar manner to the external type of magnetic tape cartridge MC1 (refer to FIG. 2), the external tag extends across a step between an inside area and outside area of the contour 34a, thereby resulting in further reminding of attention for the mis-pasting of the external tag.

As shown in FIG. 3B, the tag T2 is pasted on the tag mounting member 33 with a bond applied on backside of a substrate of the tag under condition that the antenna having a coiled shape and formed along a surface of the tag T2 is being faced to an internal surface of the side wall 32A. That is, the tag T2 is arranged at lower inside part of the side wall 32A.

The reader-writer 4 in FIG. 1 includes an antenna for transmitting and receiving information to and from an antenna of the tag T, and a controller. The reader-writer 4 wirelessly reads and writes management information of the tag T through each antenna of the reader-writer 4 and tag T by using the controller. A distance capable of communication between the reader-writer 4 and tag T depends on, for example, a frequency to be used, and a size and length of the each antenna. If the frequency is 13.56 MHz, a maximum distance of several centimeters can be obtained for the communication. Meanwhile, information that the tag is an external tag or internal tag is stored in each tag in advance. With this information, the reader-writer 4 can easily determine a type of the tag which the reader-writer 4 communicates with. Therefore, even if the external tag is pasted on the internal type of magnetic tape cartridge MC2 by mistake, the reader-writer 4 can communicate only with the internal tag T2 by using the above information.

The computer 5 shown in FIG. 1 is configured with an input unit, a storage unit, a control unit, a processing unit, and an output unit, and manages the management information, which is sequentially transferred from the controller of the reader-writer 4, of each magnetic tape cartridge MC.

The magnetic tape cartridge management system 1 configured above operates as follows.

As shown in FIG. 1, two kinds of plurality of magnetic tape cartridges MC1, MC2 are contained in the rack S. The magnetic tape cartridges MC1, MC2 are arranged in a manner so that each label L (refer to FIG. 2, FIG. 3) is faced to outside. Then, information of the label L can be checked with eyes. In addition, since the label L is arranged to face outside, the antenna of the tag T mounted on each magnetic tape cartridges MC1, MC2 also faces to outside.

Figure 4A:
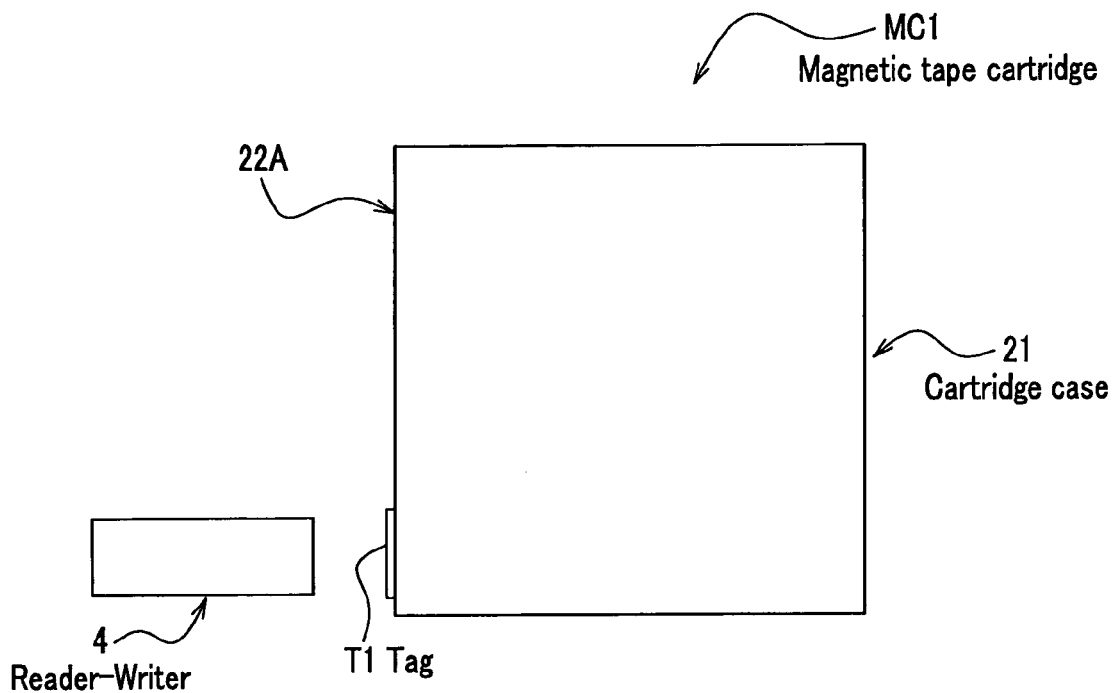
FIG. 4A is an illustration showing a positional relation between a reader-writer and a magnetic tape cartridge with an external tag.
Figure 4B:
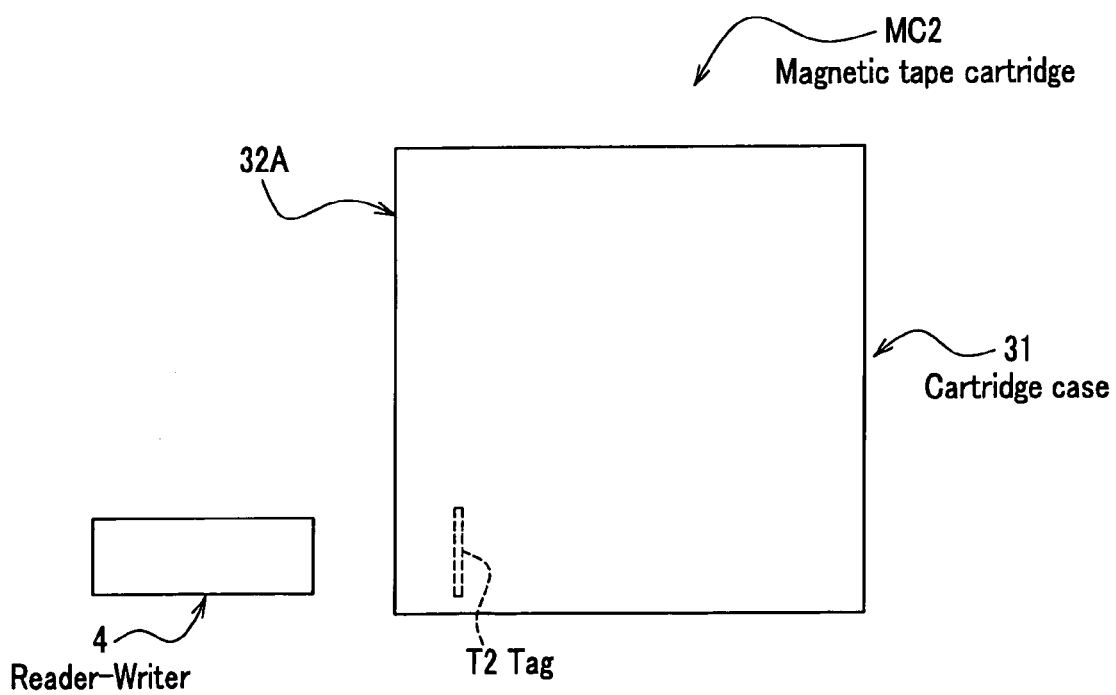
FIG. 4B is an illustration showing a positional relation between a reader-writer and a magnetic tape cartridge with an internal tag.

FIG. 4A is an illustration showing a positional relation between the reader-writer 4 and the magnetic tape cartridge with the external tag, and FIG. 4B is an illustration showing a positional relation between the reader-writer 4 and the magnetic tape cartridge with the internal tag.

The reader-writer 4 reads or writes the management information stored in the tag with an identical positional relation against each magnetic tape cartridges MC1, MC2 by a direct operation of a user or operation via the computer 5. As shown in FIG. 4A, if the reader-writer 4 is arranged facing to the side wall 22A in the case of magnetic tape cartridge MC1 on which the external tag T1 is mounted, and also, as shown in FIG. 4B, if the reader-writer 4 is arranged facing to the side wall 32A in the case of magnetic tape cartridge MC2 on which the internal tag T2 is mounted, the reader-writer 4 can read and write the management information stored in each tag T1 and T2. That is, for example, reading of the management information can be easily conducted regardless of types of the tag and magnetic tape cartridge by making a position of the reader-writer 4 identical against each magnetic tape cartridges MC1, MC2 arranged in the rack S.

Then, the management information read by the reader-writer 4 is transferred to the computer 5, and the computer 5 collectively manages the management information. In the computer 5, for example, a location of the magnetic tape cartridge MC can also be identified and can be renewed, based on the transferred ID information and location information specific to the magnetic tape cartridge MC.

Through the above, the following advantages can be obtained in the present embodiment.

In the magnetic tape cartridge management system 1 according to the embodiment, even if both of the external type of magnetic tape cartridge MC1 and internal type of magnetic tape cartridge MC2 are used, since each tag is mounted in the vicinity of predetermined area of the side walls 22A, 32A, the reader-writer 4 can easily read, for example, the management information stored in the each tag, if a position of the reader-writer 4 against each magnetic tape cartridges MC1, MC2 is identical, thereby if the position of the reader-writer 4 against each tag is identical. That is, in the magnetic tape cartridge management system 1, a management of the two types of magnetic tape cartridges MC1, MC2 can be easily conducted. Accordingly, the existing external type of magnetic tape cartridge MC1 can be continuously used without discarding, and a replacement of the external type of magnetic tape cartridge MC1 with the internal type of magnetic tape cartridge MC2 can be implemented smoothly.

In the magnetic tape cartridge MC2 according to the embodiment, since the contour 34a of the label pasting member 34 is formed with a different shape from that of the external type of magnetic tape cartridge MC1, attention for mis-mounting of the external tag is reminded. Accordingly, double-mounting of tag can be avoided, thereby resulting in prevention of troubles of the system due to the double-mounting.

Meanwhile, if the internal tag T2 is unusable due to some trouble, the identical function to that of the tag T2 can be obtained by mounting the external tag on the external surface 32a of the side wall 32A without breaking the cartridge case down.

The preferred embodiment of the present invention has been explained. However, the present invention is not limited thereto. Various modifications of the present invention are possible without departing from the spirit of the present invention.

In the embodiment, the contour 34a of the magnetic tape cartridge MC2 with the internal tag T2 has been formed with a different shape from that of the external type of magnetic tape cartridge for preventing the external tag from being mis-mounted. However, the shape of the contour 34a is not limited thereto.

For example, a surface shape of the side wall 32A may be different from that of the external type, and may be configured with a concave-convex shape, such as emboss. Further, for example, it may be possible to print characters on the side wall 32A or label L, or to make the characters to be concave-convex for reminding attention of the mis-mounting of the external tag. Furthermore, the shape of the contour 34a is not limited to the above embodiment. The shape may be, for example, a shape with a triangle, or polygon, or half circle in the lower contour, or a shape having a narrower width of the upper and lower contours. That is, any contour may be used if the contour is provided with an identification member which can be apparently distinguished with eyes from that of the external type of magnetic tape cartridge MC1.

In the embodiment, the external and internal tags have been explained by assuming that they have an identical shape. However, since the external tag is not limited by a dimension and a place to be mounted, the external tag may be larger than the internal tag. For example, the antenna may be lengthened, thereby a communication distance longer than that of the internal tag can be secured for the external tag. In this case, the external tag is not required to secure an optimal mounting position against the reader-writer 4, thereby resulting in increase of layout freedom degree of the tag.

In the embodiment, the tag T2 is pasted on the tag mounting member 33. However, the present invention is not limited to this method. Any method may be available if the tag T2 can be fixed inside of the cartridge case 31.

In the embodiment, only one reader-writer 4 is provided. However, for example, by configuring a base, on which a plurality of reader-writers 4 are arranged, to face a rack, the management information of each magnetic tape cartridge can be collectively read. In this method, since a mounting position of each tag is fixed for each magnetic tape cartridges MC1, MC2, for example, a fine-adjustment of the positional relation between the tag T and the reader-writer 4 is unnecessary.

What is claimed is:

1. A tape cartridge management system, comprising:
    a plurality of tape cartridges, each RFID tag for storing management information being arranged on any one of outside and inside of a case of each tape cartridge;
    a reader-writer for reading and writing the management information stored in the RFID tag, the reader-writer being configured to be able to read and write the management information with an identical positional relation against the plurality of the tape cartridges; and
    an identification member, disposed on the outside of each case, for preventing the RFID tag from being mismounted on the outside of each case,
    wherein each tape cartridge configured to arrange the RFID tag at the outside of the each case is provided with the RFID tag on an external surface of a side wall of each case, on which a label pasting member is disposed,
    wherein each tape cartridge configured to arrange the RFID tag at the inside of each case is provided with the RFID tag on an internal surface of the side wall of each case, on which the label pasting member is disposed,
    wherein the identification member is formed with the label pasting member having a different shape of contour from a label pasting member of a tape cartridge where the RFID tag is not arranged adjacent to the side wall within the tape cartridge, and
    wherein the different shape is so formed that the RFID tag, which is to be mounted on the external surface of the side wall, must extend across a step formed between an inside area and an outside area of the contour.

2. The tape cartridge management system according to claim 1, wherein the RFID tag comprises:
    an IC chip for storing the management information; and
    an antenna connected to the IC chip and for transmitting and receiving the management information to and from the reader-writer.

3. The tape cartridge management system according to claim 1, wherein the reading and writing of the management information stored in the RFID tag are implemented without contact by the reader-writer.

4. The tape cartridge management system according to claim 1, wherein the management information stored in the RFID tag is ID information specific to the tape cartridge.

5. The tape cartridge management system according to claim 1, wherein the management information stored in the RFID tag is location information specific to the tape cartridge.

6. The tape cartridge management system according to claim 1, wherein information that the RFID tag is arranged any one of the outside and inside of the case is stored in advance in the RFID tag.

7. The tape cartridge management system according to claim 1, wherein a size of the RFID tag arranged at the outside of the case is same with a size of the RFID tag arranged at the inside of the case.

8. The tape cartridge management system according to claim 1, wherein a size of the RFID tag arranged at the outside of the case is different from a size of the RFID tag arranged at the inside of the case.

9. A tape cartridge comprising a case having a label pasting member disposed on an external surface of a side wall of the case and having an RFID tag is arranged adjacent to the side wall within the case;
    an identification member, disposed on the outside of each case, for preventing the RFID tag from being mismounted on the outside of each case,
    wherein the identification member is formed with the label pasting member having a different shape of contour from a label pasting member of a tape cartridge where the RFID tag is not arranged adjacent to the side wall within the tape cartridge, and
    wherein the different shape is so formed that the RFID tag, which is to be mounted on the external surface of the side wall, must extend across a step formed between an inside area and an outside area of the contour.

10. The tape cartridge according to claim 9, wherein the contour of the label pasting member is formed with an upper rectangular contour and a lower rectangular contour having a narrower width than the upper rectangular contour, and the upper and lower rectangular contours are continuously integrated in one.

11. The tape cartridge according to claim 9, wherein the contour of the label pasting member comprises an upper rectangular contour and a lower contour having any one of shapes of a triangle, a polygon, and a half-circle.

12. The tape cartridge according to claim 9, wherein the identification member is formed with an external surface of the side wall having a shape different from a shape of external surface of a side wall of a tape cartridge where the RFID tag is not arranged adjacent to the side wall within the tape cartridge.

13. The tape cartridge according to claim 12, wherein the different shape of external surface of the side wall is a concave-convex shape.

14. The tape cartridge according to claim 9, wherein the identification member is provided with a notice on the external surface of the side wall for reminding attention.

* * * * *